United States Patent
Sans et al.

[15] 3,652,036
[45] Mar. 28, 1972

[54] DYNAMIC FORCED AIR INTAKES FOR VEHICLES

[72] Inventors: Claude M. Sans, Massy; Jacky R. Leynaert, Igny; Georges D. Meauzé, Paris, all of France

[73] Assignee: The Office Nationale d'Etudes et de Recherches Aerospatiales (O.N.E.R.A.), Chatillon-Sous-Bagneux, France

[22] Filed: Oct. 21, 1969

[21] Appl. No.: 868,087

[30] Foreign Application Priority Data

Oct. 24, 1968 France......................................171181

[52] U.S. Cl..........................................244/53 B, 137/15.2
[51] Int. Cl......................................................B64d 33/02
[58] Field of Search..............244/53 B, 42 CA, 42 CD, 42 R; 239/265.13, 265.17; 137/15.1, 15.2; 60/35.6 LL

[56] References Cited

UNITED STATES PATENTS

| | | | |
|---|---|---|---|
| 3,446,223 | 5/1969 | Hancock | 137/15.2 |
| 3,222,863 | 12/1965 | Klees et al. | 244/53 B |
| 2,321,837 | 6/1943 | Maxwell | 244/123 |
| 3,272,458 | 9/1966 | Bracka | 244/42 CA |
| 3,295,555 | 1/1967 | James et al. | 244/53 B |

*Primary Examiner*—Trygve M. Blix
*Assistant Examiner*—Steven W. Weinrieb
*Attorney*—Larson, Taylor and Hinds

[57] ABSTRACT

The forced air intake for vehicles and more particularly for high-speed subsonic aircraft comprises a frontal opening bounded by a profile the shape of which is determined as a function of the laws of aerodynamics brought into play when the vehicle is travelling at its nominal speed. This air intake usually cooperates with a turbojet for propelling the vehicle. The air intake comprises a plurality of movable flaps arranged over the outer surface of the profile, adjacent its leading edge. In their retracted position, the movable flaps restore the contour of the profile. In their extended position, the movable flaps define an intake horn for the air intake and a succession of convergent passages between their inner surfaces and the outer surface of the profile.

11 Claims, 10 Drawing Figures

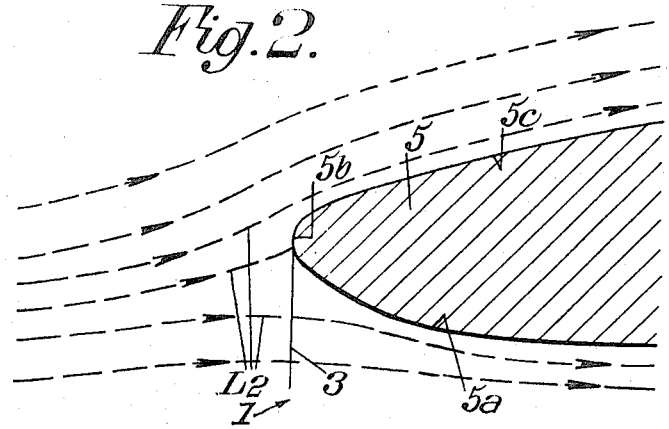
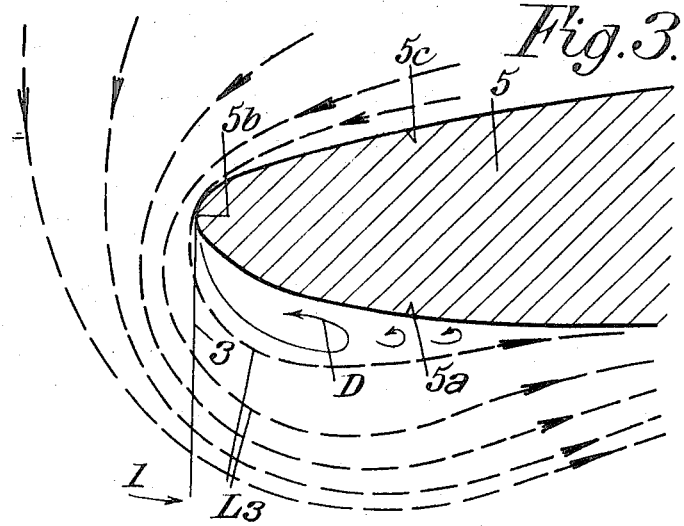

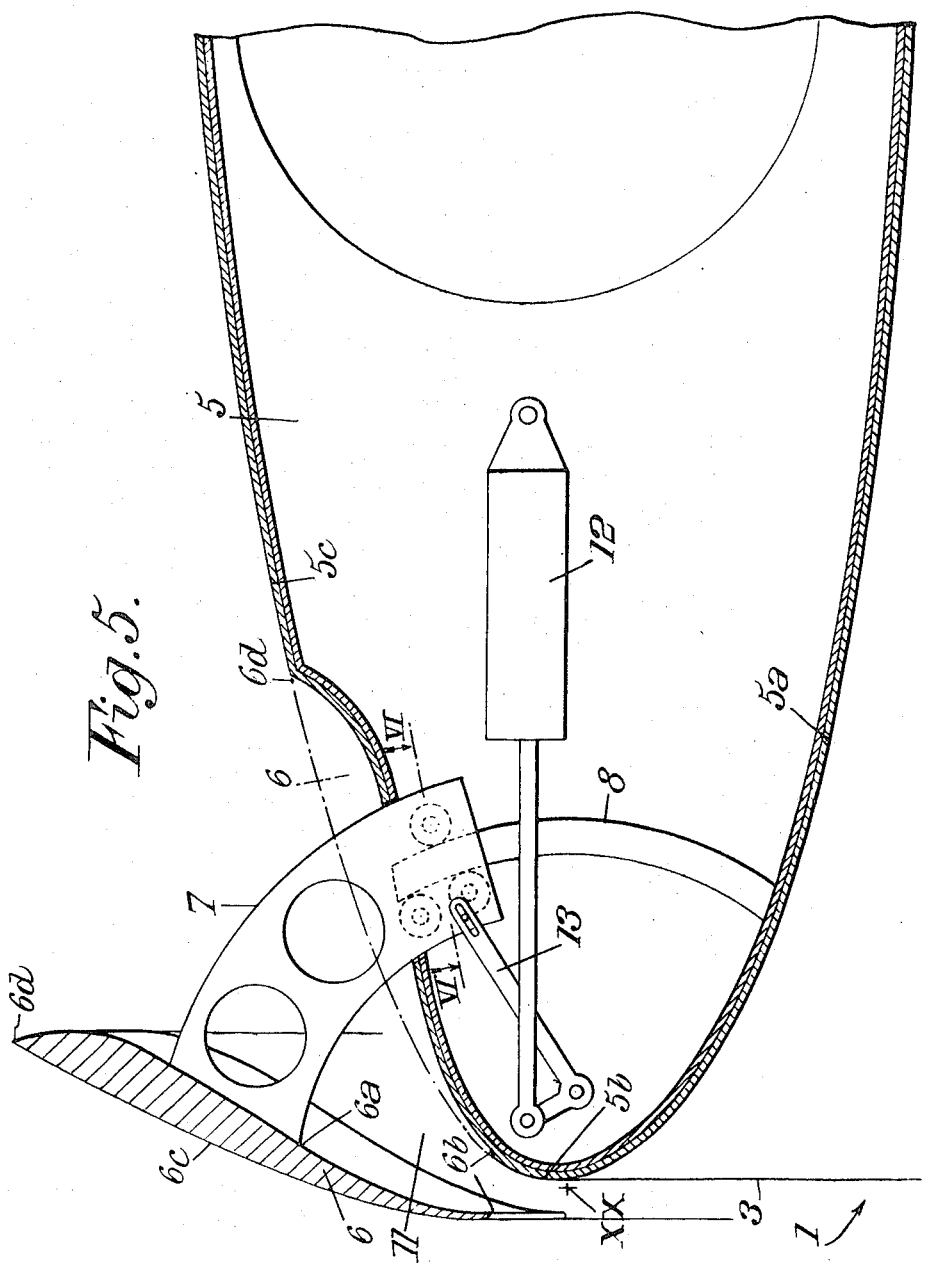

DYNAMIC FORCED AIR INTAKES FOR VEHICLES

Generally speaking this invention relates to dynamic forced air intakes for vehicles, the expression "dynamic forced air intake" designating an air intake which on the one hand has a frontal opening lying in a plane perpendicular (or at least approximately perpendicular) to the longitudinal velocity vector of the vehicle and being consequently orientated so that air penetrates thereinto when the vehicle is in motion and which, on the other hand, comprises suction means so disposed as to cause air to be drawn in through said frontal opening irrespective of the speed of the vehicle, that is to say even when said speed is zero or very low.

The invention relates more particularly though not exclusively to air intakes of the kind positioned at the inlet end of aircraft propulsion units and notably at the inlet end of single or bypass flow turbojets or at the input end of propeller shrouds.

It is well known that the shape to be imparted to the profile bounding all or part of the frontal opening of air intakes of the kind referred to is as a rule determined according to the laws of aerodynamics involved when the vehicle is travelling at a speed equal or close to its nominal speed.

Now the shape established for the nominal speed of the vehicle is not suitable for the flow, generated principally by the suction means, which is set up in the region of the frontal opening of the air intake when the vehicle is stationary or moving at a speed greatly below its nominal speed.

In order to improve this flow it has already been proposed to cause such air intakes to include deformable elements positioned level with the frontal opening of the air intake, which deformable elements occupy an inoperative configuration which restores the continuity of the profile when the vehicle is moving at its nominal speed but occupy an operative configuration which increases the thickness and the radius of curvature of the leading edge of said profile when the vehicle is stationary or moving at a speed greatly below its nominal speed.

An air intake equipped with such deformable elements nonetheless possesses certain drawbacks which notably concern:

the impossibility of achieving rigorously determined geometrical forms when the deformable elements are in their operative configuration, the difficulty, when the deformable elements are in their operative configuration, of achieving a profile suited to the flow set up in the region of the frontal opening of the air intake, the great mechanical stresses to which the deformable elements are subjected when in their operative configuration, and the inadequate reliability of the deformable elements due to ageing of the material of which they are made, such material being as a rule based on plastics.

It has also been proposed to equip the air intake with movable flaps designed, when in their extended position, to form a converging duct extending the air intake forwardly, such flaps pivoting about axles located in succession along the leading edge of the air intake.

This is not a completely satisfactory solution because the converging duct does not entirely avoid the risk of boundary layer separation over that portion of the inner face of the profile which is adjacent the leading edge.

Further, constructional difficulties make it virtually impossible to produce the profile with the required accuracy, for it would be necessary to obtain a profile suited to all the flap positions corresponding to all the different convergent duct shapes, notably in the case when the flaps are either retracted or extended. Hence this solution can at best be a compromise solution only.

Finally, the existence of hinge axles along the leading edge introduces a break in the continuity of the profile that could cause flow separation.

It has further been proposed to associate with the air intake an axially movable annular lip that bounds an adjustable slot jointly with the leading edge.

This provision merely makes it possible to provide guidance for the flow in order to reduce turbulence, but, owing to the position and shape of the annular lip, the fact that the annular lip moves axially, and the absence of a convergent duct upstream of the profile, such a slot cannot eliminate flow separation by a blowing effect.

Furthermore, since the annular lip cannot form a convergent duct, it cannot help to reduce the velocity gradients.

Lastly, the annular lip forms a break in continuity which could prove to be a source of turbulence.

It is one object of the present invention to provide an air intake which is free from the disadvantages mentioned above in connection with prior art air intakes.

It is another object of the invention to provide an air intake equipped with movable flaps, that is light, simple and the movable flaps of which have small overall bulk.

It is still another object of the invention to provide an air intake equipped with movable flaps actuated by control means of less power than the control means used to actuate the movable flaps of prior art air intakes.

An air intake according to this invention comprises a frontal opening having its plane perpendicular to the longitudinal velocity vector of the vehicle, and suction means so disposed as to cause the air to be drawn in through said frontal opening, the shape of the profile bounding all or part of said frontal opening being determined as a function of the laws of aerodynamics brought into play when the vehicle is travelling at its nominal speed, the said air intake further comprising a plurality of movable flaps positioned on that part of the outer face of the profile which bounds all or part of said frontal opening, said flaps being furthermore located adjacent the leading edge of said profile and being so devised as to be capable of moving between two limit positions, and said air intake being characterized by the fact that the said two limit positions are on the one hand, a retracted position suitable for when the vehicle is travelling at its nominal speed and such that the movable flaps restore the profile contour as perfectly as possible, and, on the other hand, an extended position suitable for when the vehicle is stationary or moving at a speed greatly below its nominal speed and such that said movable flaps bound, first, by means of their outer surfaces and in co-operation with the leading edge and the inner surface of the profile, intake horn through which passes a main flow generated by the suction means, and second, by means of their inner surfaces and in co-operation with the outer surface of the profile adjacent the leading edge, a convergent passageway through which passes an induced flow likewise generated by the suction means about the profile, the action of the induced flow on the main flow enabling any flow separation over that part of the inner profile surface which is adjacent the leading edge to be avoided.

The description which follows with reference to the accompanying non-limitative exemplary drawings will give a clear understanding of how the invention can be carried into practice.

FIG. 2 is a partial diagrammatic showing of the flow at the inlet of such an air intake when the vehicle is moving at its nominal speed;

FIG. 3 shows correspondingly to FIG. 2 the flow at the inlet of said air intake when the vehicle is stationary, said air intake being devoid of the improvements according to the present invention;

Figure 7:
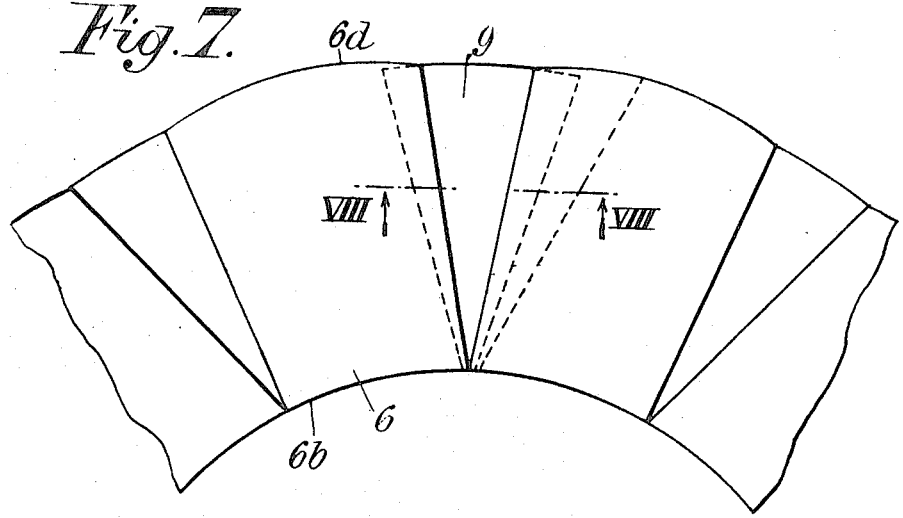
Figure 8:
Figure 9:
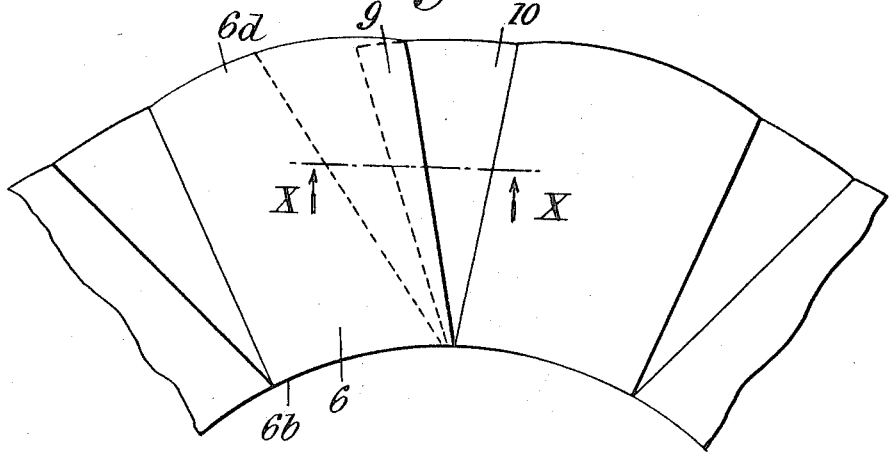
Figure 10:
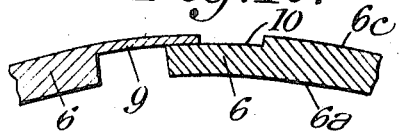

FIG. 4 portrays, correspondingly to FIG. 3, the flow at the inlet of the air intake when the vehicle is stationary, this air intake embodying the improvements according to the invention;

FIG. 5 shows in partial section on an enlarged scale an air intake according to one specific embodiment of the invention;

FIG. 6 is a section along line VI—VI of FIG. 5;

FIG. 7 is a partial front view of an air intake according to a first alternative embodiment of the invention;

FIG. 8 is a section along line VIII—VIII of FIG. 7;

FIG. 9 is a frontal view of an air intake devised in accordance with a second alternative embodiment of the invention; and FIG. 10 is a section along line X—X of FIG. 9.

Figure 1:
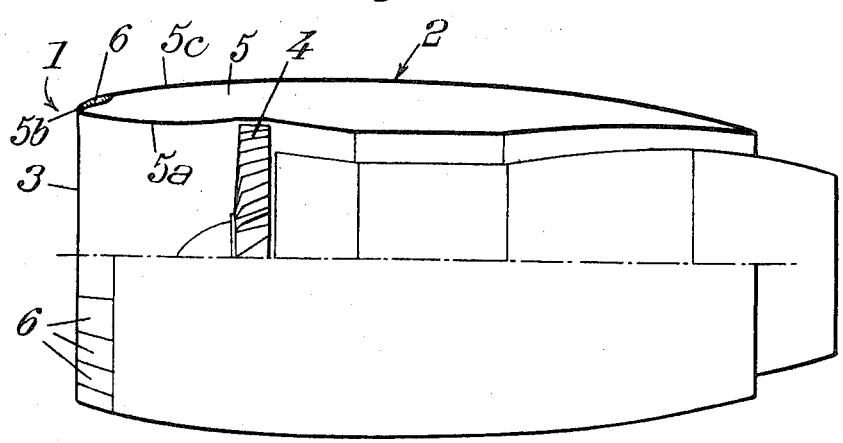
FIG. 1 shows partly in schematic section and partly as an external view, a vehicle propulsion unit equipped with an air intake according to this invention.

As shown in FIG. 1, an air intake 1 is located at the inlet of a propulsion unit, which will hereinafter be assumed to be a bypass turbojet 2 for a high-speed subsonic aircraft.

Air intake 1 comprises a frontal opening 3 having its plane perpendicular to the axial velocity vector of the aircraft, which frontal opening 3 is consequently oriented so that air is drawn thereinto when the aircraft is in forward flight.

Air intake 1 further includes suction means so disposed as to cause air to be drawn in through frontal opening 3 irrespective of the speed of the aircraft, that is to say even when the flight speed is zero or very low, such suction means being formed by the turbojet compressor(s) 4 in the example considered herein in which the power plant includes a turbojet 2.

The shape of the profile 5 bounding the frontal opening 3 (which is circular in the specific application considered herein) of air intake 1 is determined according to the laws of aerodynamics brought into play when the aircraft is travelling at a speed equal or close to its nominal speed.

The shape of profile 5, and notably the shape of its portion adjacent the leading edge, is shown in FIGS. 1–4.

FIG. 2 shows the flow in the region of the frontal opening 3 (by means of the lines $L_2$) when the aircraft is travelling at its nominal speed.

FIG. 3 shows the flow (by means of the lines $L_3$), likewise in the region of the frontal opening 3, when the speed of the aircraft is zero, such flow being then generated by the rotation of the compressor(s) 4 of turbojet 2.

It will be appreciated that the shape of the profile 5 is not suited to such a flow and that eddying separations D will occur over that portion of the inner surface 5a of profile 5 which is adjacent the leading edge 5b.

Air intake 1 further includes a plurality of movable flaps 6 arranged over the outer surface 5c of profile 5 bounding the frontal opening 3, said flaps 6 being located adjacent leading edge 5b of profile 5 and being devised so as to be capable of jointly moving between two limit positions.

These two limit positions are, on the one hand, a retracted position (shown in dot-dash lines in FIGS. 4 and 5) suitable for when the aircraft is travelling at its nominal speed and in which said movable flaps 6 restore the contour of profile 5 as perfectly as possible, and on the other hand, an extended position (shown in solid lines in FIGS. 4 and 5) suitable for when the aircraft is stationary or travelling at a speed greatly below its nominal speed and in which said movable flaps 6 bound, first, by means of their outer surfaces 6c and jointly with the leading edge 5b and the inner surface 5a of profile 5, an intake horn through which passes a main flow generated by the rotation of the compressor(s) 4 of turbojet 2 and, second, by means of their inner surfaces 6a and jointly with the outer surface 5c of profile 5 proximate the leading edge 5b, a convergent passage 11 through which passes an induced flow likewise generated by the rotation of the compressor(s) 4 of turbojet 2.

It will be appreciated that under these conditions the action of the induced flow on the main flow will prevent any flow separations from occurring over that part of the inner surface 5a of profile 5 which is adjacent the leading edge 5b.

FIG. 4, on which the resultant flow is illustrated by the lines $L_4$, shows that this flow does indeed take place without lifting.

A preferred embodiment of the present invention is shown in FIGS. 5 and 6.

In this particular embodiment, each moving flap 6 is mounted on a support 7, guided by a circular sector-shaped rail 8, or possibly two such rails, these two rails 8 (of which only one is visible in FIG. 5) being fully housed in the profile 5.

The radius of curvature and the position of these two rails 8 are such that the axis XX on which their centers lie is located forwardly and inwardly in relation to the leading edge 6b of any such movable flap 6 when the latter is in its retracted position. Thus, the moving flaps 6 can be butt-joined in perfect fashion when in their retracted position.

When moving flaps 6 are in their extended position, clear spaces are left between their leading edges 6b and their trailing edges 6d. As can be seen from FIG. 5, which is an axial cross-section of the intake, the taper of the flap towards the leading edge 6b is more gradual than that towards the trailing edge 6d. It may be of advantage to block these clear spaces by causing each moving flap 6 to comprise, as shown in FIGS. 7–10, a lateral extension 9 which, when the moving flaps 6 are moved from their extended position to their retracted position, engages in a lodging 10 formed in the adjacent moving flap 6.

In FIGS. 7 and 8, the lodging 10 is represented as being a slot formed in the body of moving flap 6.

In FIGS. 9 and 10, the lodging 10 is illustrated as being obtained by spotfacing the surface of movable flap 6.

When movable flaps 6 are in their extended position, a part of the air flow sucked in as a result of the rotation of the turbojet compressor(s) 4 passes through the succession of convergent passages 11 formed between movable flaps 6 and profile 5.

This part of the sucked-in air flow, which constitutes the induced flow, can be regulated to the desired magnitude by imparting an appropriate section to each convergent passage 11. Alternatively, this part of the air flow forming the induced flow can be regulated to the required magnitude by providing open-work or solid screens positioned upstream of the convergent passages 11, such screens (not shown) being preferably rigid with the several supports 7.

Consideration will next be given to the means to which recourse may be had for actuating the movable flaps 6.

Such means may be formed by jacks 12 each of which actuates a movable flap 6 through the agency of a bellcrank 13, and these jacks 12 can be activated by the pilot of the aircraft or be referenced to the speed of the aircraft (FIG. 5).

Alternatively, said means could be constituted by the aerodynamic forces which are exerted on each movable flap 6 and which vary with the speed of the aircraft, in which case each movable flap 6 may be loosely mounted in relation to the profile 5. For when the speed of the aircraft is zero and the flow in the region of frontal opening 3 is generated by the rotation of the turbojet compressor(s) 4, a negative pressure reigns on the outer surface 6b of each movable flap 6 that fetches and holds all the movable flaps 6 in their extended position.

As soon as the speed of the aircraft increases, the magnitude of this negative pressure diminishes and is ultimately nullified, whereas the inner surface 6a of each flap 6 is subjected to a negative pressure the magnitude of which increases with the speed of the aircraft, and this inverting of the negative pressures causes all the movable flaps to move from their extended position to their retraced position and to be restrained in that position.

In cases where the aerodynamic forces are used to actuate the movable flaps, recourse is preferably had to dampers, each connected to one movable flap, such dampers being intended to prevent any tendency of the flaps to vibrate violently at certain flight speeds.

Finally, an air intake devised as hereinbefore disclosed offers high aerodynamic efficiency at low speeds and under static conditions because the flow resulting from the action of the induced flow on the main flow takes place smoothly without lifting from that portion of the inner surface of the profile which is adjacent the leading edge.

This is accomplished by means of the movable flaps and the convergent passages, since the induced flow through said convergent passages operates with a blowing effect on the boundary layer, thereby eliminating flow separation, notably of the kind caused by small breaks in continuity that may subsist when the movable flaps are in their extended position. In any event, this break in continuity is located near the throats of the convergent passages, i.e. where it has least disrupting effect.

The elimination of all apparent hinge axles, especially near the leading edge of the profile, prevents any risk of flow separation resulting from an uneven surface.

Further, the favourable effect of the induced flow on the main flow makes it possible to reduce the size of the intake horn and hence that of the movable flaps. This results, first, in weight saving and reduced bulk, and second, in a decrease in the power required of the actuating means possibly used to control the movable flaps.

Thus the air intake is finally lighter, less complicated, and offers high mechanical strength, and in particular higher rigidity, — all of which are advantages which assume their full significance in the realm of aeronautics, which is the preferred field of application of the present invention.

What we claim is:

1. A dynamic forced air intake for vehicles and more particularly for high-speed subsonic aircraft, comprising means defining a frontal opening the plane of which is perpendicular to the axial velocity vector of the vehicle and suction means for drawing air in through said frontal opening, the shape of the profile bounding at least part of said frontal opening being such as to satisfy the laws of aerodynamics brought into play when the vehicle is travelling at its nominal speed, said intake further including a plurality of movable flaps positioned over the outer surface of the said profile, said movable flaps forming at least an outer part of the leading edge of said profile and being capable of movement, under the action of command means, between two limit positions, characterized by the fact that the two limit positions are, a first, retracted position suitable for when the vehicle is travelling at its nominal speed and in which the movable flaps restore the contour of the profile as perfectly as possible, and, a second, extended position suitable for when the vehicle is stationary or is moving at a speed greatly below its nominal speed and in which said movable flaps bound, on the one hand, by means of their outer surfaces and in co-operation with the leading edge and the inner surface of the profile, an intake horn through which passes a main flow generated by the suction means, and on the other hand, by means of their inner surfaces and in co-operation with the outer surface of the profile adjacent the leading edge, a convergent passage through which passes an induced flow likewise generated by the suction means about the profile such that the induced flow acts upon the main flow to avoid all flow separations over that part of the inner surface of the profile adjacent the leading edge.

2. An air intake according to claim 1 further including means for regulating the magnitude of the induced flow.

3. An air intake according to claim 1 wherein each movable flap is mounted on a support guided by a circular sector shaped rail fully recessed into the profile, the position of this rail and its radius of curvature being such that the axis upon which its center lies is located forwardly and offset inwardly in relation to the forward edge of the associated movable flap when the same is in its retracted position.

4. An air intake according to claim 1 wherein the command means used to control the movable flaps are jacks which respectively actuate one of the movable flaps through a bellcrank, said jacks being either controlled by the pilot of the vehicle or referenced to the speed of the vehicle.

5. An air intake according to claim 1, wherein said flaps are so shaped that the leading edge substantially preserves the shape and position thereof whatever the position of the flaps.

6. An air intake according to claim 1, wherein the axial section of said flaps tapers more gradually towards the leading edge than towards the trailing edge.

7. An air intake according to claim 1 wherein the command means used to control the movable flaps are the aerodynamic forces which are exerted on each flap and which vary with the speed of the vehicle, each movable flap being mounted for loose motion in relation to the profile.

8. An air intake according to claim 7 further including dampers each connected to one movable flap, said dampers being intended to prevent any vibration of said flaps which could become incipient at certain speeds of the vehicle.

9. An air intake according to claim 1 wherein the free spaces which when the movable flaps are in their extended position exist between the forward and rear edges thereof are obturated by lateral extensions, each movable flap comprising a lateral extension which engages into a lodging formed in the adjacent movable flap when the movable flaps are moved from their extended position to their retracted position.

10. An air intake according to claim 9 wherein each lodging is a slit formed in the thickness of the movable flap.

11. An air intake according to claim 9, wherein each lodging is formed by spotfacing the movable flap.

* * * * *